United States Patent [19]
Eaton

[11] Patent Number: 6,043,963
[45] Date of Patent: Mar. 28, 2000

[54] LOW-PROFILE TAPE CARTRIDGE

[75] Inventor: James Howard Eaton, Morgan Hill, Calif.

[73] Assignee: International Business Machines Corporation, Armonk, N.Y.

[21] Appl. No.: 09/067,490

[22] Filed: Apr. 27, 1998

[51] Int. Cl.[7] .................................................. G11B 23/02
[52] U.S. Cl. ........................................... 360/132; 242/348
[58] Field of Search ........................ 360/132; 242/338.1, 242/338.2, 338.3, 343, 343.2, 348, 348.2

[56] References Cited

U.S. PATENT DOCUMENTS

| | | | |
|---|---|---|---|
| 3,682,415 | 8/1972 | Ibuchi | 242/338.1 |
| 3,987,489 | 10/1976 | Schoettle et al. | 242/348 |
| 4,347,537 | 8/1982 | Schoettle et al. | 360/132 |
| 4,555,077 | 11/1985 | Platter et al. | 242/198 |
| 5,031,065 | 7/1991 | Flor et al. | 242/336 |
| 5,588,606 | 12/1996 | Kikuchi et al. | 242/347 |
| 5,758,837 | 6/1998 | Doninelli | 242/346.1 |
| 5,813,622 | 9/1998 | Alten | 242/348 |
| 5,883,771 | 3/1999 | Hoerger | 360/132 |

*Primary Examiner*—Craig A. Renner
*Assistant Examiner*—Angel Castro
*Attorney, Agent, or Firm*—Robert M. Sullivan; Michael E. Noe; Andrew J. Dillon

[57] ABSTRACT

A low profile tape cartridge has a reel which rotates within an outer protective shell. The reel has flanges which define a slot containing a roll of magnetic tape. The shell only surrounds the reel along its circumference and the flat upper and lower surfaces of the flanges are exposed. When assembled, the reel and shell have axial thicknesses which are substantially equal. The shell moves between locked and unlocked positions for engaging and disengaging the reel. The cartridge uses and fits within a shell retainer for creating uniform spacing around the reel when the shell is in the unlocked position. The tape is accessed by loading a cartridge into the retainer in a tape drive. The tape drive unlocks the shell to rotate the reel and extract the tape. After use, the tape is retracted onto the reel and the cartridge is then returned to the locked position.

16 Claims, 4 Drawing Sheets

LOW-PROFILE TAPE CARTRIDGE

TECHNICAL FIELD

This invention relates in general to magnetic tape cartridges and in particular to a low profile magnetic tape cartridge.

BACKGROUND ART

A conventional magnetic tape cartridge consists of one or more rotatable tape reels for moving the magnetic tape. Each of the reels typically has flanges which guide and shield the tape from a stationary outer protective shell. Cartridges of this type usually contain a brake and a clutch. The brake prevents the reels from turning and loosening the tape when it is handled outside of tape drive. The clutch is provided for engaging the drive motor to turn the tape reels.

After providing for clearances, tolerances, and clutch and brake actuation, these cartridges are typically twice as thick as the width of the tape they contain. For example, a cartridge which contains one-half inch wide tape is approximately one inch thick. This geometric constraint reduces the volumetric efficiency of cartridges, which is defined as the volume of tape divided by the minimum rectangular envelope of the cartridge. Cartridges with a single reel have a volumetric efficiency of about 20%, whereas cartridges with more than one reel have a volumetric efficiency of about 8%.

DISCLOSURE OF THE INVENTION

A low profile magnetic tape cartridge has a reel which rotates within an outer protective shell. The reel has a pair of parallel flanges which define a slot containing a roll of magnetic tape. The shell only surrounds the reel along its circumference at the peripheries of the flanges. The flat upper and lower surfaces of the flanges are exposed. When assembled, the reel and shell have axial thicknesses which are substantially equal.

The shell utilizes a mechanism to move between locked and unlocked positions for engaging and disengaging the reel. The cartridge uses and fits within a shell retainer for creating uniform spacing around the reel when the shell is in the unlocked position. The retainer is a plate having a perpendicular wall located in the desired position of the outside of the cartridge when in the open position. The wall defines the range of movement for the shell.

The magnetic tape on the reel is accessed by loading a cartridge into the retainer in a tape drive. The tape drive actuates the mechanism to unlock the shell. With the cartridge in the unlocked position, the reel is rotatable and the tape may be extracted. After use, the tape is retracted onto the reel and the cartridge is then returned to the locked position.

BEST MODE FOR CARRYING OUT THE INVENTION

Although the present invention comprises a low profile magnetic tape cartridge with an increased volumetric efficiency, the invention may be more clearly understood and appreciated with a discussion of a prior art magnetic tape cartridge.

Figure 1:
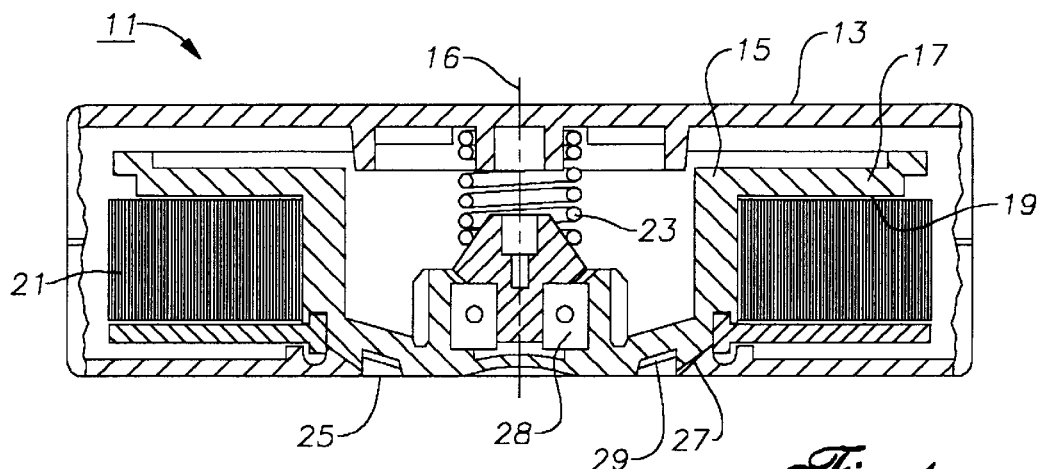
FIG. 1 is a sectional side view of a prior art magnetic tape cartridge.

Referring to FIG. 1, a conventional prior art magnetic tape cartridge 11 is shown. Cartridge 11 has an outer protective housing or shell 13 which contains a single coaxial tape reel 15 for rotation therein. Shell 13 is a resilient, inward-biased split ring which completely surrounds reel 15 on all sides. Reel 15 has a rotational axis 16 and a pair of flanges 17 which define a cylindrical slot 19. Slot 19 is provided for housing a roll of magnetic tape 21. Note that tape 21 is approximately one-half inch wide and that cartridge 11 has an overall thickness of about one inch. This design achieves a volumetric efficiency of approximately 20%.

In the view of FIG. 1, reel 15 is biased downward against a lower portion of shell 13 by a spring 23. Spring 23 is located between the inner surface of an upper portion of shell 13 and an upper portion of reel 15. An opening 25 on one side of shell 13 exposes a central portion of reel 15. Reel 15 has a clutch 27 which engages a drive motor (not shown) to turn reel 15 on a set of bearings 28. Reel 15 also has a brake 29 to prevent reel 15 from turning and loosening tape 21 when cartridge 11 is handled outside the tape drive (not shown).

In operation, cartridge 11 is loaded into the tape drive. As clutch 27 is engaged by the drive motor, reel 15 is pushed upward and inward relative to opening 25 in shell 13. This slight axial movement by reel 15 disengages brake 29, thereby allowing reel 15 to rotate about axis 16 on bearings 28 relative to shell 13. Tape 21 is then engaged and read by the tape drive in a conventional manner.

Figure 2:
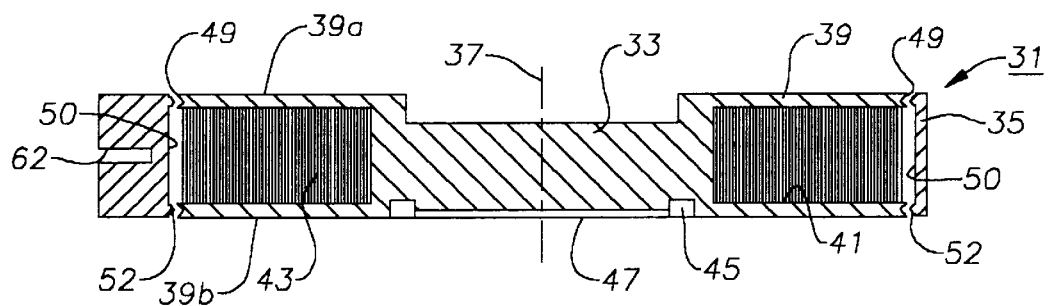
FIG. 2 is a sectional side view of a magnetic tape cartridge constructed in accordance with the invention.

Referring now to FIGS. 2–8, a first embodiment of a low profile magnetic tape cartridge 31 is shown. Like cartridge 11, cartridge 31 has a single tape reel 33 which rotates within an outer protective shell 35 about a central axis 37 (FIG. 2). Reel 33 has a pair of parallel flanges 39 which define a cylindrical slot 41 containing a roll of magnetic tape 43. However, unlike shell 13, shell 35 only surrounds reel 15 on its circumference at the peripheries of flanges 39.

The flat upper and lower surfaces 39a, 39b of flanges 39 are left completely exposed and act as a hard exterior for cartridge 31. The terms "upper" and "lower" are used herein for convenience only. When assembled, reel 33 and shell 35 have axial thicknesses which are substantially equal such that upper and lower surfaces 39a, 39b of flanges 39 are substantially flush with the upper and lower edges of shell 35. Note that even through cartridges 11 and 31 contain the same size tape, cartridge 31 is only 33% wider than tape 43. In one embodiment, tape 43 is one-half inch (12.7 mm) wide and cartridge 31 is 16.9 mm thick. This design is more compact than prior designs and achieves a volumetric efficiency of approximately 37%.

Figure 4:
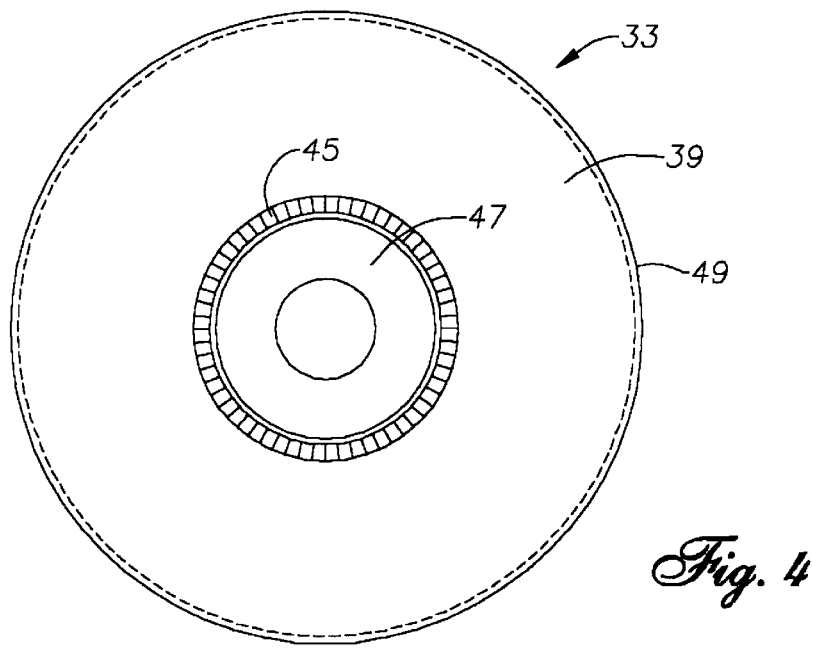
FIG. 4 is a plan view of an empty reel of the cartridge of FIG. 2.

As shown in FIGS. 2 and 4, one side of reel 33 contains a gear 45 for engaging a drive motor (not shown). Reel 33 also has a concentric metallic washer 47 which may be magnetically engaged. Each flange 39 has a circular outer edge or circumference containing a shallow V-groove 49 which circumscribes it. V-grooves 49 are provided as alignment slots for reel 33 when cartridge 31 is not in use.

Figure 5:
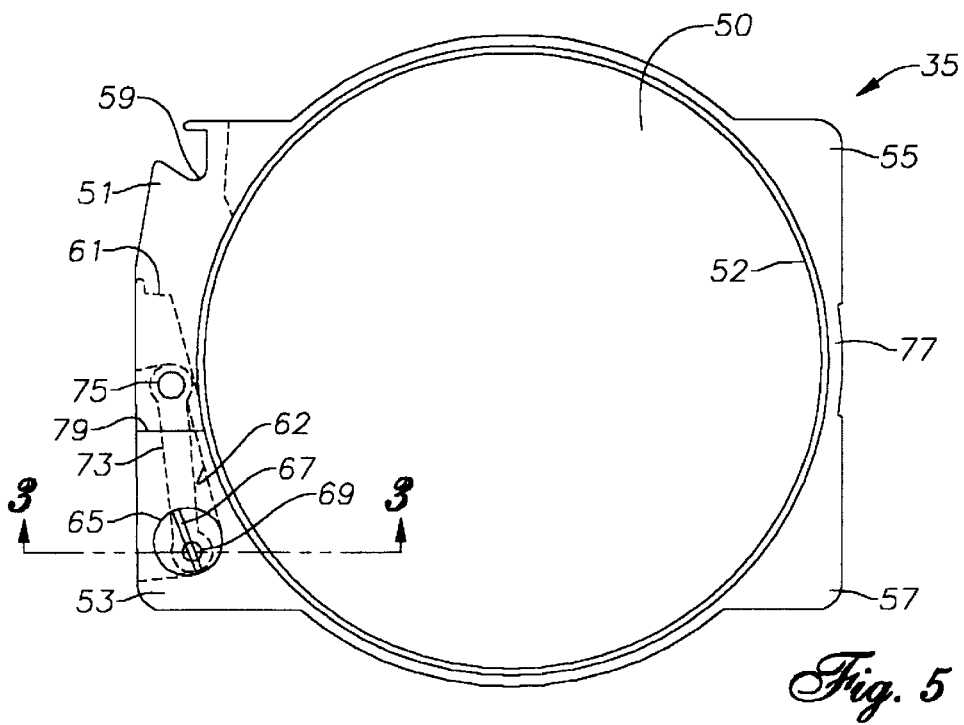
FIG. 5 is a plan view of the protective shell of the cartridge of FIG. 2 shown in the closed position.
Figure 6:
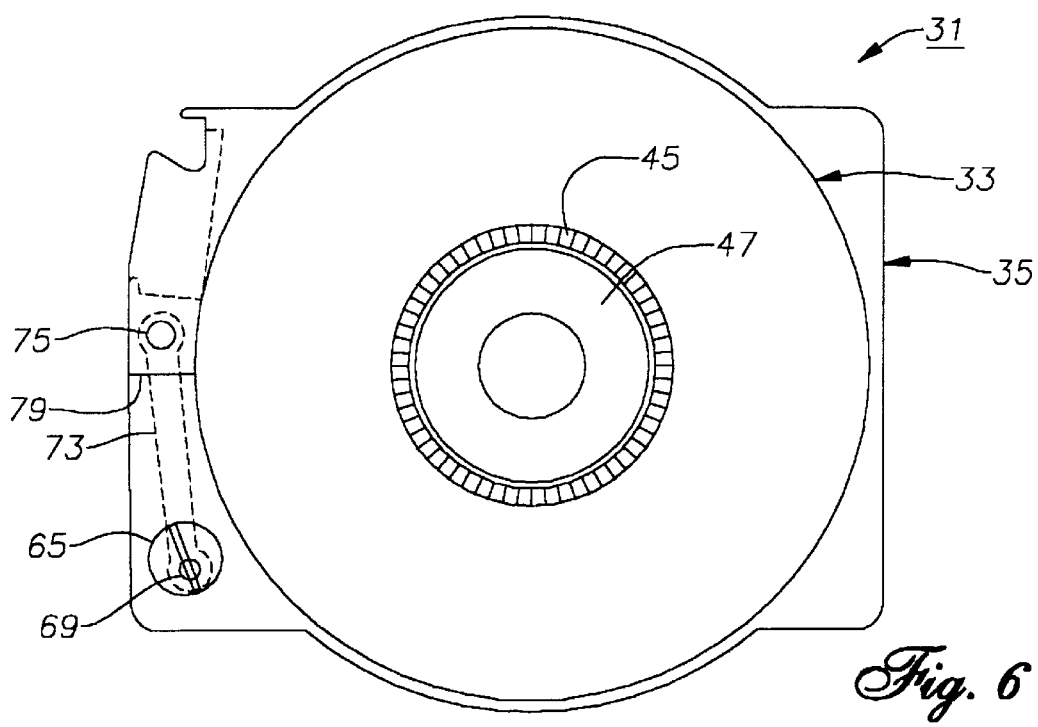
FIG. 6 is a plan view of the cartridge and protective shell of FIGS. 2 and 5, respectively, shown assembled with the protective shell in the closed position.

Referring now to FIG. 5, shell 35 is shown without reel 33 and in the locked position. Shell 35 is generally rectangular and has a large circular hole 50 extending through it for closely receiving reel 33. Hole 50 has a pair of parallel V-ribs 52 extending radially inward near its upper and lower edges. As shown in FIG. 2, V-ribs 52 are provided for engaging V-grooves 49 so that reel 33 is tightly retained in shell 35 when shell 35 is in the locked position.

Figure 3:
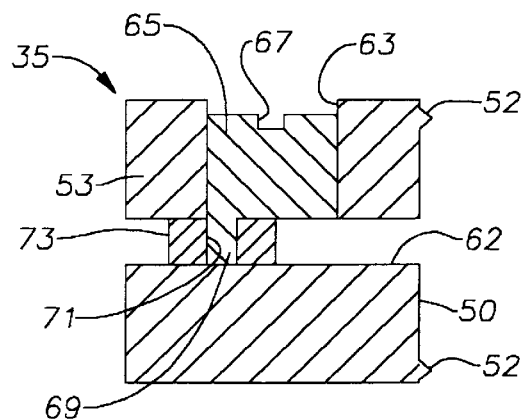
FIG. 3 is an enlarged sectional side view of one lobe of a protective shell of the cartridge of FIG. 2 taken along the line 3—3 of FIG. 5.

Shell 35 has a solid lobe 51, 53, 55 and 57 on each corner. Lobe 51 contains a notch or cutout 59 for accommodating a conventional leader block (not shown). Lobe 51 also has an opening 61 along its edge which extends to hole 50 to provide access to tape 43. As shown in FIGS. 2 and 3, a narrow horizontal slot 62 bisects and extends into both lobes 51, 53. Lobe 53 has a vertical hole 63 (FIG. 3) which closely receives a cylindrical actuating cam 65. Cam 65 is rotatable in hole 63. Cam 65 has a rectangular diametrical slot 67 on its upper surface and a small eccentric pin 69 extending downward from its lower surface. Pin 69 extends into a hole 71 on one end of a lever 73 which lies flat in and is closely received by slot 62 (FIGS. 3 and 5). The opposite end of lever 73 (FIG. 5) is pivotally mounted to lobe 51 with a vertical pin 75. Alternatively, shell 35 could be locked and unlocked with a lead screw-type actuator (not shown).

Shell 35 is preferably formed from a resilient plastic material which forms a hard case for protecting tape 43 on reel 33. Shell 35 has a thin side wall 77 which extends between and joins lobes 55 and 57. Side wall 77 acts as a hinge to allow lobes 51, 53 to separate tangentially relative to axis 37 along a gap 79 when cam 65 is actuated and cartridge 31 moves to its unlocked position. As shown in FIG. 5, gap 79 is closed and the circumference of hole 50 matches an outer diameter of flanges 39 when lobes 51, 53 abut one another. Gap 79 widens and the circumference of hole 50 increases as lobes 51, 53 move apart from one another (FIG. 8).

Figure 7:
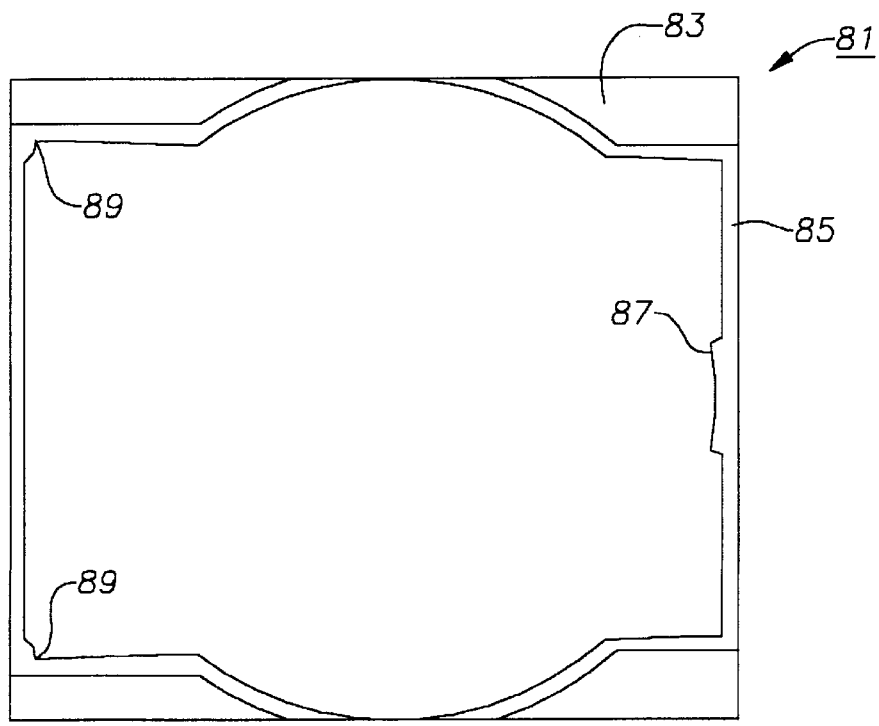
FIG. 7 is a plan view of a retainer for the cartridge of FIG. 2.
Figure 8:
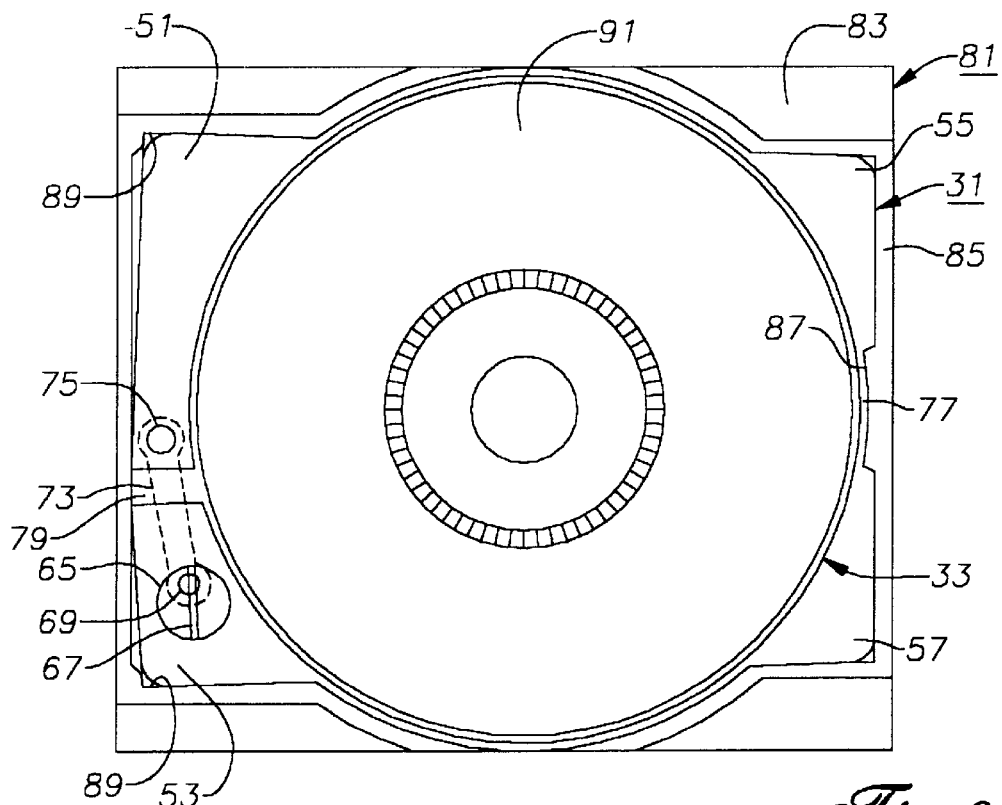
FIG. 8 is a plan view of the assembly of FIG. 6 mounted in the retainer of FIG. 7 with the protective shell in the open position.

Referring to FIGS. 7 and 8, cartridge 31 is designed for use with a shell retainer 81 for creating uniform spacing around reel 33 when shell 35 moves to the unlocked position. Ideally, retainer 81 will be located within the tape drive (not shown). Retainer 81 is a generally rectangular plate 83 having a perpendicular wall 85 with the same shape as the outside of the open cartridge 31. Wall 85 has a height (approximately 3 mm) which is only a fraction of the thickness of cartridge 31.

The inner dimensions of wall 85 are precisely defined to closely receive cartridge 31 while allowing it to move between its locked and unlocked positions. Although plate 83 supports cartridge 31 at all times, it is wall 85 which defines the range of movement of shell 35. For example, wall 85 has a shoulder 87 (FIG. 7) which contacts and supports side wall 77 on cartridge 31 (FIG. 8) throughout its range of movement. Wall 85 also has slight recesses 89 in its left side corners which receive and allow lobes 51, 53 to spread apart a small distance when cartridge 81 is unlocked. Note that when cartridge 31 is mounted in retainer 81 in the unlocked position, a small, uniform clearance 91 of approximately 1 mm is maintained between the outside diameter of reel 33 and the inside diameter of shell 35.

In operation, a locked cartridge 31 (FIG. 6) is loaded into retainer 81 (FIG. 7) in the tape drive. In the locked position, V-ribs 52 on shell 35 engage V-grooves 49 on reel 33 so that reel 33 is locked from movement and cannot turn with respect to shell 35. To unlock cartridge 31, cam 65 is rotated clockwise in hole 63. A screwdriver-type head (not shown) located within the tape drive engages slot 67 to rotate cam 65. The rotation of cam 65 moves pin 69 which forces lever 73 toward lobe 51. Since lever 73 is pivotally mounted in lobe 51 with pin 75, lobes 51 and 53 are forced apart as shell 35 flexes about side wall 77. When lobes 51, 53 separate, the outer edges of shell 35 are forced against the inner surface of wall 85 until it is in the desired position. This movement causes V-ribs 52 to disengage and withdraw from V-grooves 49, thereby freeing reel 33 for rotation by the tape drive relative to shell 33 and retainer 81. Since lobes 51–57 are rigid and constrained at several points, the clearance 91 between shell 35 and reel 33 is consistently maintained. With cartridge 31 in the unlocked position, tape 43 is extracted with the leader block (not shown) through opening 61.

After use, tape 43 is disengaged by the leader block and retracted onto reel 33. Cartridge 31 is then returned to the locked position by rotating cam 65 counterclockwise until lobes 51, 53 abut one another. Cam 65 is again engaged and rotated by the screwdriver-type head within the tape drive. As cartridge 31 moves from the unlocked position to the locked position, V-ribs 52 re-engage V-grooves 49 and shell 35 recedes from wall 85 so that reel 33 is once again locked from movement relative to shell 35.

Figure 9:
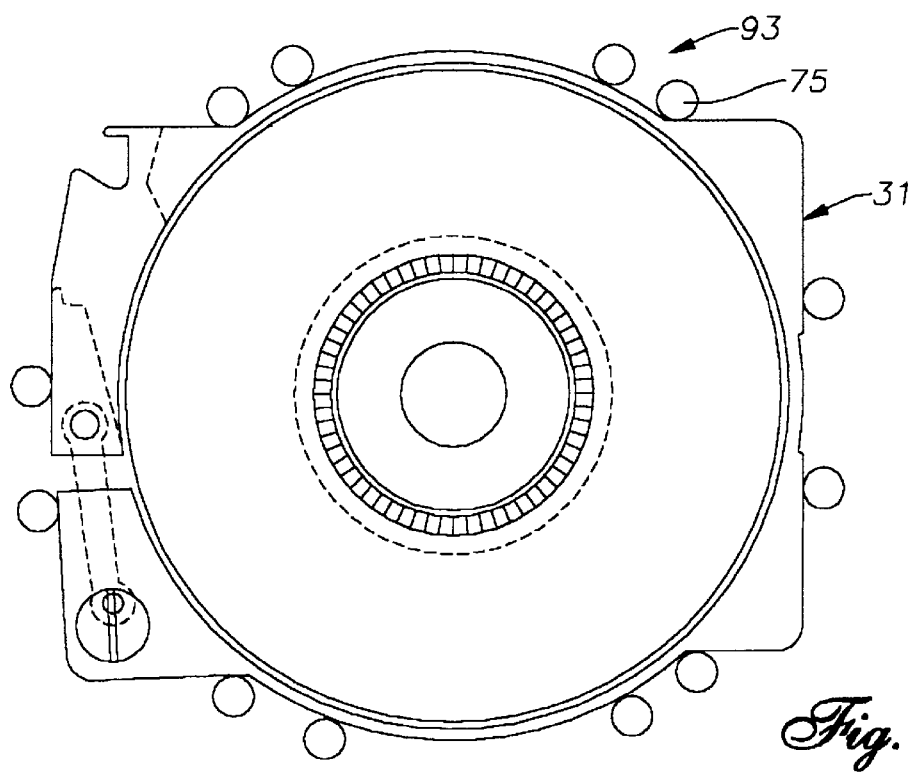
FIG. 9 is a plan view of the assembly of FIG. 6 mounted in an alternate embodiment of the retainer of FIG. 7 with the protective shell in the open position.

An alternate embodiment for shell retainer 81 is shown in FIG. 9. Shell retainer 93 comprises a plurality of locating pins 95 which are strategically located to accomplish the same restraint of shell 35 as wall 85 on retainer 81. Each pin 95 is designed to contact and support shell 35 to limit its outward movement when cartridge 31 is in the unlocked position. Cartridge 31 works in an identical manner as described above when used with retainer 93.

The invention has several advantages. The low profile design of this magnetic tape cartridge achieves a volumetric efficiency of approximately 37%. This is a significant improvement over other single reel designs' 20% volumetric efficiency. The invention utilizes the flanges of the reel to form the side walls of the cartridge to achieve this improvement. The V-ribs and groove design locks in and protects the reel and tape when the cartridge is not in use. The minimal clearance between the reel and the protective shell when the cartridge is in the unlocked position further enhances the efficiency of the design.

While the invention has been shown or described in only some of its forms, it should be apparent to those skilled in the art that it is not so limited, but is susceptible to various changes without departing from the scope of the invention.

I claim:
1. A magnetic tape cartridge, comprising:
   a reel having a hub, a pair of parallel flanges extending radially from the hub, a circumference, and a rotational axis, wherein the flanges are adapted to surround a roll of magnetic tape wound on the hub of the reel;
   a drive member rigidly and coaxially mounted on the reel, the drive member being adapted to engage a drive motor in a tape drive for rotating the reel therewith;
   a shell having an inner surface which surrounds the circumference of the reel; and wherein the cartridge has a locked position wherein the shell engages the circumference of the reel to prevent movement therebetween, and an unlocked position wherein the shell disengages the circumference of the reel to allow the reel to rotate relative thereto.

2. The cartridge of claim 1 wherein the shell is a resilient split ring, and wherein a diameter of the inner surface of the shell increases when the cartridge is moved from the locked position to the unlocked position.

3. The cartridge of claim 2, further comprising a rigid shell retainer which extends around and is contacted by an outer surface of the shell when in the unlocked position, the retainer limiting movement of the shell to the unlocked position to maintain a desired clearance between the shell and the reel.

4. The cartridge of claim 1 wherein the shell is a resilient split ring which is biased inward, and wherein a diameter of the inner surface of the shell increases when the cartridge is moved from the locked position to the unlocked position, the diameter of the inner surface being sized so as to grip an outer edge of each of the flanges while the cartridge is in the locked position.

5. The cartridge of claim 1, further comprising:

a protruding rib located along an outer edge of one of the flanges and the inner surface of the shell; and a pair of grooves located along the other of the flanges and the inner surface of the shell for engaging said protruding ribs when the cartridge is in the locked position.

6. The cartridge of claim 1 wherein the shell is a resilient, inward-biased split ring having two ends separated by a gap, and wherein the cartridge further comprises a lever which extends from a first side of the gap to a second side of the gap, one end of the lever being movable relative to the shell to push the ends further apart to the unlocked position.

7. The cartridge of claim 5 wherein the lever is attached to a fixed point on the first side of the gap and a cam member on second side of the gap, so that rotation of the cam member in one direction spreads the ends apart and rotation of the cam member in an opposite direction causes the ends to move toward each other.

8. The cartridge of claim 1 wherein each of the reel and the shell have an axial thickness that are approximately equal to one another.

9. A magnetic tape cartridge, comprising:

a reel having a pair of parallel flanges extending radially from a rotational axis for holding a roll of magnetic tape wound on the reel;

a drive member rigidly and coaxially mounted on the reel, the drive member being adapted to engage a drive motor in a tape drive for rotating the reel therewith;

a resilient split ring having an inner surface with a diameter and two ends which are separated by a gap, the inner surface of the split ring surrounding a circumference of the reel;

a lever extending from a first side of the gap in the split ring to a second side of the gap; and wherein the cartridge has a locked position wherein the split ring engages the circumference of the reel to prevent movement therebetween, and an unlocked position wherein the diameter of the inner surface of the split ring expands in response to movement of the lever relative to the split ring to push the ends of the split ring apart and to disengage the circumference of the reel to allow the reel to rotate relative thereto.

10. The cartridge of claim 9 wherein the split ring is biased inward.

11. The cartridge of claim 9, further comprising:

a protruding rib located along an outer edge of each of the flanges; and a pair of grooves located along the inner surface of the split ring for engaging the ribs on the flanges when the cartridge is in the locked position.

12. The cartridge of claim 9 wherein the lever has a first end attached to a fixed pivot point on the first side of the gap and a second end pivotally attached to a cam member on the second side of the gap, so that rotation of the cam member in one direction spreads the ends apart, and rotation in the opposite direction draws the ends together.

13. The cartridge of claim 9, further comprising a rigid split ring retainer which extends around and is contacted by an outer surface of the split ring when in the unlocked position, the retainer limiting expansive movement of the split ring to the unlocked position to maintain a desired clearance between the split ring and the reel.

14. A magnetic tape cartridge, comprising:

a reel having a pair of parallel flanges extending radially from a rotational axis for holding a roll of magnetic tape wound on the reel;

a drive member rigidly and coaxially mounted on the reel, the drive member being adapted to engage a drive motor in a tape drive for rotating the reel therewith;

a resilient, inward-biased split ring having an inner surface with a diameter and two ends which are separated by a gap, the inner surface of the split ring surrounding a circumference of the reel, the diameter of the split ring being sized so as to grip an outer edge of each of the flanges, and the split ring having locked and unlocked positions;

a lever extending from a first side of the gap in the split ring to a second side of the gap; and wherein in the locked position the split ring engages the circumference of the reel to prevent movement therebetween, and in the unlocked position the diameter of the inner surface of the split ring expands in response to movement of the lever relative to the split ring to push the ends of the split ring apart and to disengage a circumference of the reel to allow the reel to rotate relative thereto; and a rigid split ring retainer which is contacted by an outer surface of the split ring when in the unlocked position, the retainer limiting expansive movement of the split ring to the unlocked position to maintain a desired clearance between the split ring and the reel.

15. The cartridge of claim 14, further comprising:

a protruding rib located along an outer edge of each of the flanges; and a pair of grooves located along the inner surface of the split ring for engaging the ribs on the flanges when the cartridge is in the locked position.

16. The cartridge of claim 14 wherein the lever has a first end attached to a fixed pivot point on the first side of the gap; wherein the cartridge further comprises:

a cam member with an eccentric pin on the second side of the gap, the lever having a second end attached to the cam member so that rotation of the cam member in one direction rotates the eccentric pin to move the fixed pivot point relative to the movable other side to spread the ends of the split ring apart.

* * * * *